(12) United States Patent
Privault et al.

(10) Patent No.: US 8,339,680 B2
(45) Date of Patent: Dec. 25, 2012

(54) PRINTER IMAGE LOG SYSTEM FOR DOCUMENT GATHERING AND RETENTION

(75) Inventors: Caroline Privault, Montbonnot-Saint-Martin (FR); Victor Ciriza, La Tour du Pin (FR); Yeriv Reave Reisler, Dublin (IE); Jean M. Ellefson, Buckinghamshire (GB)

(73) Assignee: Xerox Corporation, Norwalk, CT (US)

( * ) Notice: Subject to any disclaimer, the term of this patent is extended or adjusted under 35 U.S.C. 154(b) by 863 days.

(21) Appl. No.: 12/417,110

(22) Filed: Apr. 2, 2009

(65) Prior Publication Data

US 2010/0253967 A1 Oct. 7, 2010

(51) Int. Cl.
*G06F 3/12* (2006.01)
*H04N 1/00* (2006.01)

(52) U.S. Cl. ........ 358/403; 382/159; 382/305; 707/661; 707/672; 707/707; 707/769

(58) Field of Classification Search .................. 358/1.9, 358/1.15, 1.16, 403; 382/159, 305, 321; 726/27, 28; 707/661–668, 672, 673, 769, 707/707, 740; 719/317
See application file for complete search history.

(56) References Cited

U.S. PATENT DOCUMENTS

| | | | |
|---|---|---|---|
| 6,738,760 B1 * | 5/2004 | Krachman | 1/1 |
| 6,775,422 B1 * | 8/2004 | Altman | 358/403 |
| 6,883,008 B2 * | 4/2005 | Crivella et al. | 704/1 |
| 7,139,754 B2 | 11/2006 | Goutte et al. | |
| 7,382,939 B2 | 6/2008 | Kanatsu | |
| 7,457,808 B2 | 11/2008 | Gaussier et al. | |
| 7,701,624 B2 * | 4/2010 | Yamada et al. | 358/504 |
| 8,156,101 B2 * | 4/2012 | Indeck et al. | 707/707 |
| 2003/0028534 A1 * | 2/2003 | Crivella et al. | 707/10 |
| 2003/0033323 A1 * | 2/2003 | Crivella et al. | 707/104.1 |
| 2003/0101187 A1 | 5/2003 | Gaussier et al. | |
| 2004/0117404 A1 * | 6/2004 | Crivella et al. | 707/104.1 |
| 2005/0111051 A1 | 5/2005 | Uchikawa | |
| 2005/0141000 A1 * | 6/2005 | Yamada et al. | 358/1.9 |
| 2005/0187892 A1 | 8/2005 | Goutte et al. | |
| 2005/0210256 A1 * | 9/2005 | Meier et al. | 713/176 |
| 2005/0256863 A1 * | 11/2005 | Crivella et al. | 707/4 |

(Continued)

FOREIGN PATENT DOCUMENTS

JP 06-270477 9/1994

(Continued)

OTHER PUBLICATIONS

U.S. Appl. No. 12/174,721, filed Jul. 17, 2008, Renders, et al.

(Continued)

*Primary Examiner* — Kimberly A Williams
(74) *Attorney, Agent, or Firm* — Fay Sharpe LLP

(57) ABSTRACT

A system and method for document image acquisition and retrieval which find application in litigation for responding to discovery requests are disclosed. The method includes automatically acquiring image data and associated records for documents being processed by a plurality of image output devices within an organization and archiving the image data and associated records as image logs for the processed documents. When a request for document production is received by the organization, the image logs (and/or information extracted therefrom) are automatically filtered through at least one classifier trained to return documents responsive to the document request, and documents corresponding to the filtered out image logs are output. One of the filters may be configured for filtering privileged from non-privileged documents.

22 Claims, 3 Drawing Sheets

U.S. PATENT DOCUMENTS

| | | | |
|---|---|---|---|
| 2006/0072144 A1* | 4/2006 | Dowling et al. | 358/1.15 |
| 2006/0184543 A1 | 8/2006 | Fukuta | |
| 2006/0197928 A1 | 9/2006 | Hirai | |
| 2006/0232594 A1 | 10/2006 | Kanematsu | |
| 2006/0282468 A1* | 12/2006 | Crivella et al. | 707/104.1 |
| 2006/0290975 A1 | 12/2006 | Murakami et al. | |
| 2007/0005340 A1 | 1/2007 | Goutte et al. | |
| 2007/0005639 A1 | 1/2007 | Gaussier et al. | |
| 2007/0118760 A1 | 5/2007 | Masui | |
| 2007/0133043 A1 | 6/2007 | Maekawa et al. | |
| 2007/0133054 A1 | 6/2007 | Kobayashi et al. | |
| 2007/0135930 A1 | 6/2007 | Kirisara et al. | |
| 2007/0143101 A1 | 6/2007 | Goutte | |
| 2007/0239745 A1 | 10/2007 | Guerraz et al. | |
| 2007/0273921 A1 | 11/2007 | Yamakawa | |
| 2007/0276843 A1* | 11/2007 | Lillibridge et al. | 707/100 |
| 2008/0038002 A1 | 2/2008 | Ono | |
| 2008/0040350 A1 | 2/2008 | Aoki | |
| 2008/0100873 A1 | 5/2008 | Ohtsu | |
| 2008/0130884 A1 | 6/2008 | Matsumoto et al. | |
| 2008/0249999 A1 | 10/2008 | Renders et al. | |
| 2008/0300900 A1* | 12/2008 | Demarest et al. | 705/1 |
| 2008/0301084 A1* | 12/2008 | Demarest et al. | 707/1 |
| 2008/0301099 A1* | 12/2008 | Demarest | 707/3 |
| 2008/0301172 A1* | 12/2008 | Demarest et al. | 707/102 |
| 2008/0301207 A1* | 12/2008 | Demarest et al. | 707/206 |
| 2008/0301284 A1* | 12/2008 | Demarest et al. | 709/224 |
| 2008/0301471 A1* | 12/2008 | Demarest et al. | 713/193 |
| 2008/0301713 A1* | 12/2008 | Demarest et al. | 719/317 |
| 2008/0301756 A1* | 12/2008 | Demarest et al. | 726/1 |
| 2008/0301757 A1* | 12/2008 | Demarest et al. | 726/1 |
| 2009/0240689 A1* | 9/2009 | Fenne et al. | 707/5 |
| 2009/0265609 A1* | 10/2009 | Rangan et al. | 715/234 |
| 2010/0149593 A1* | 6/2010 | Dowling et al. | 358/1.15 |
| 2010/0241988 A1* | 9/2010 | Steeb et al. | 715/784 |
| 2010/0293193 A1* | 11/2010 | Harrison et al. | 707/769 |
| 2011/0029536 A1* | 2/2011 | Knight et al. | 707/740 |
| 2011/0047168 A1* | 2/2011 | Ellingsworth | 707/749 |
| 2011/0047177 A1* | 2/2011 | McCreight et al. | 707/769 |

FOREIGN PATENT DOCUMENTS

JP   2005-157569   6/2005

OTHER PUBLICATIONS

U.S. Appl. No. 12/417,130, filed Apr. 2, 2009, Monet, et al.

Canon, *Providing High-Tech Security for Paper Media, imageWARE Job Archive System*, http://www.canon.com/technology/canon_tech/explanation/imageware_jarchive/html, downloaded Feb. 19, 2009.

Farley, et al., Before Producing E-Documents, *New York Law Journal*, Feb. 19, 2008.

Fuji, *Image Log Management Software, ApeosWare Image Log Service Pro 1.1*, Report No. 18 2008, http://www.fujixerox.com/eng/company/technology/, downloaded Jan. 14, 2009.

Gaussier, et al., A Hierarchical Model for Clustering and Categorizing Documents, *In Advances in Information Retrieval, Proc. of the 24th BCS-IRSG European Colloquium on IR Research (ECIR-02)*, Mar. 25-27, 2002.

Guidance Software, *EnCase Data Audit and Policy Enforcement*, copyright 2008, http://www.guidancesoftware.com/dataaudit/da_index.aspx, downloaded Mar. 16, 2009.

Message Solution, *Message Solution Enterprise Email Archive*, http://www.messagesolution.com/images/EEA_datasheet, downloaded Feb. 19, 2009.

Sebastiani, Machine Learning in Automated Text Categorization, *ACM Computing Surveys*, vol. 34, No. 1, pp. 1-47. Mar. 2002.

* cited by examiner

PRINTER IMAGE LOG SYSTEM FOR DOCUMENT GATHERING AND RETENTION

CROSS REFERENCE TO RELATED PATENTS AND APPLICATIONS

The following copending applications, the disclosures of which are incorporated by reference in their entireties, are mentioned:

U.S. application Ser. No. 12/174,721, filed Jul. 17, 2008, entitled CATEGORIZER WITH USER-CONTROLLABLE CALIBRATION, by Jean-Michel Renders, Caroline Privault, and Eric Cheminot.

U.S. application Ser. No. 12/417,130, filed Apr. 2, 2009, entitled APPARATUS AND METHOD FOR DOCUMENT COLLECTION AND FILTERING, by Nicolas Monet, Michel Gastaldo, Caroline Privault, and Jacki O'Neill.

BACKGROUND

The exemplary embodiment relates to document categorization. It finds particular application in the automatic gathering and collection of documents, for example, in litigation by providing companies with complementary tools for automating the document evidence gathering and collection phase in discovery processes. However, it is to be appreciated that the method and system are applicable to document handling for other applications.

In civil litigation, each party is permitted to seek documentary evidence from the opposing party during the discovery period. Even the contemplation or threat of a lawsuit is sufficient to require preservation of relevant documents. Discovery often extend to both hardcopy and electronic documents. Thus, complying with discovery requests is often time consuming, difficult, and prone to error, due to the large number of electronic and paper documents which are created, modified, and stored in different locations.

In order to ensure that documents which could be considered relevant are properly retained, litigants often generate a vast collection of electronic documents which are printed out and/or burned to CDs for review by counsel. Typically, each employee collects the potentially relevant documents in his area, puts them on an individual storage medium, such as a DVD, and sends the media to a collection point specified in the preservation memorandum, or to a collection coordinator. This approach has several disadvantages: the collecting process is not transparent or uniform, it is highly variable and can be slow, it is burdensome for the employee; the decision of what is relevant is left at the employee's discretion and judgment, document hardcopies are frequently omitted, (especially if they have no electronic counterpart on the employee desktop), documents that should not be part of the collection (unrelated marketing studies, strategic plans, privilege exchanges) can be collected inadvertently by the employee, and lots of duplicates are generated (same documents collected by several different employees).

Many companies establish document retention policies and processes to be followed when it is time for discovery materials to be gathered. Sometimes, dedicated software is employed which automatically provides for the forensic acquisition of data across a company's computer network. Some of these applications also provide for the cataloging and storing of relevant data in repositories and generating of reports, thereby eliminating over-collection and collection of irrelevant data. Even with such retention policies and search tools in place, problems still exist. For example, relevant documents may be paper documents (hardcopies) that have been manipulated at one time by the company employees, without necessarily being stored in electronic format on the company network or personal computer.

INCORPORATION BY REFERENCE

The following references, the disclosures of which are incorporated in their entireties herein by reference, are mentioned:

U.S. Pat. No. 7,139,754, issued Nov. 21, 2006, entitled METHOD FOR MULTI-CLASS, MULTI-LABEL CATEGORIZATION USING PROBABILISTIC HIERARCHICAL MODELING, by Cyril Goutte, et al. discloses a method for categorizing a set of objects, which includes defining a set of categories in which at least one category in the set is dependent on another category in the set, organizing the set of categories in a hierarchy that embodies any dependencies among the categories in the set, and for each object, assigning to the object one or more categories from the set of possible categories for which the object is relevant. A new set of labels is defined comprising all possible combinations of any number of the categories, such that if an object is relevant to several categories, the object is assigned the unique label corresponding to that subset of all relevant categories.

U.S. Pat. No. 7,457,808, issued Nov. 25, 2008, entitled METHOD AND APPARATUS FOR EXPLAINING CATEGORIZATION DECISIONS, by Cyril Goutte, et al., discloses a method and an apparatus in which feature selection is used to determine feature influence for a given categorization decision to identify those features in a categorized document that were important in classifying the document into one or more classes.

U.S. Pub. No. 2003/0101187, published May 29, 2003, entitled METHODS, SYSTEMS, AND ARTICLES OF MANUFACTURE FOR SOFT HIERARCHICAL CLUSTERING OF CO-OCCURRING OBJECTS, by Eric Gaussier, et al. discloses a system for hierarchical topical clustering of text data based on statistical modeling of co-occurrences of (document, word) pairs.

U.S. Pub. No. 2007/0005340, published Jan. 4, 2007, entitled INCREMENTAL TRAINING FOR PROBABILISTIC CATEGORIZER, by Cyril Goutte, et al., discloses a probabilistic document categorizer which has an associated vocabulary of words and an associated plurality of probabilistic categorizer parameters derived from a collection of documents. When a new document is received, the parameters are updated to reflect addition of the new document to the collection of documents based on vocabulary words contained in the new document, a category of the new document, and a collection size parameter indicative of an effective total number of instances of vocabulary words in the collection of documents.

U.S. Pub. No. 2007/0005639, published Jan. 4, 2007, entitled CATEGORIZATION INCLUDING DEPENDENCIES BETWEEN DIFFERENT CATEGORY SYSTEMS, by Eric Gaussier, et al., discloses a method for categorizing an object respective to at least two categorization dimensions, each categorization dimension being defined by a plurality of categories. A probability value indicative of the object for each category of each categorization dimension is determined and a categorization label is selected for the object respective to each categorization dimension based on (i) the determined probability values of the categories of that categorization dimension and (ii) the determined probability values of categories of at least one other of the at least two categorization dimensions.

U.S. Pub. No. 2007/0143101, published Jun. 21, 2007, entitled CLASS DESCRIPTION GENERATION FOR CLUSTERING AND CATEGORIZATION, by Cyril Goutte, discloses a method for characterizing a class of a probabilistic classifier or clustering system that includes probabilistic model parameters. For each of a plurality of candidate words or word combinations, divergence of the class from other classes is computed, based on one or more probabilistic model parameters profiling the candidate word or word combination. One or more words or word combinations is selected for characterizing the class as those candidate words or word combinations for which the class has substantial computed divergence from the other classes.

U.S. Pub. No. 2007/0239745, published Oct. 11, 2007, entitled HIERARCHICAL CLUSTERING WITH REAL-TIME UPDATING, by Agnes Guerraz, et al., discloses a probabilistic clustering system which is defined at least in part by probabilistic model parameters indicative of word counts, ratios, or frequencies characterizing classes of the clustering system. An association of one or more documents in the probabilistic clustering system is changed from one or more source classes to one or more destination classes. Probabilistic model parameters characterizing classes affected by the changed association are locally updated without updating probabilistic model parameters characterizing classes not affected by the changed association.

U.S. Pub. No. 2008/0249999, published Oct. 9, 2008, entitled INTERACTIVE CLEANING FOR AUTOMATIC DOCUMENT CLUSTERING AND CATEGORIZATION, by Jean-Michel Renders, et al., discloses a method in which documents are clustered or categorized to generate a model associating documents with classes. Outlier measures are computed for the documents indicative of how well each document fits into the model. Ambiguity measures are computed for the documents indicative of a number of classes with which each document has similarity under the model. The clustering or categorizing is repeated adjusted based on received user input.

Image logging systems are disclosed, for example, in U.S. Pub. Nos. 2006/0290975; 2007/0118760; 2007/0133043; 2007/0133054; 2007/0135930; 2008/0100873; 2008/0038002; and 2008/0040350.

The following publications relate generally to job archiving: U.S. Pub. Nos. 2006/0184543; 2006/0197928; 2006/0232594; 2007/0273921; 2008/0130884 and U.S. Pat. No. 7,382,939.

BRIEF DESCRIPTION

In accordance with one aspect of the exemplary embodiment, a method for document image acquisition and retrieval includes automatically acquiring image logs for documents being processed by a plurality of image output devices within an organization, archiving the image logs for the processed documents in a computer-readable storage medium, when a request for document production is received by the organization, automatically filtering, through at least one classifier trained to return documents responsive to the document request, at least one of the image logs or information derived therefrom.

In accordance with another aspect of the exemplary embodiment, a computer implemented system for document image acquisition and retrieval includes a capturing component for automatically acquiring image data and associated records for documents being processed by a plurality of image output devices. An archiving component receives the acquired image data and records from the capturing component and archives the image data and associated image records as image logs in an associated archive. A selection component automatically filters the image logs or information extracted therefrom through at least one classifier trained to return documents responsive to a document request.

In another aspect, a method for document image acquisition and retrieval includes automatically capturing image logs for all documents being printed, copied, scanned, or faxed by any one of a plurality of image output devices within an organization, the image output devices being selected from printers, copiers, scanners, fax machines and multifunction devices. The method further includes automatically archiving the captured image logs for at least a predetermined retention period, and when a request for document production is received by the organization, training at least one classifier with a training set of responsive documents and automatically filtering the archived captured image logs or information extracted therefrom through the at least one classifier to generate a set of responsive documents and outputting the set of responsive documents.

DETAILED DESCRIPTION

The exemplary embodiment relates to a system (apparatus) and method for automatic gathering and collection of documents, which finds particular use in litigation processes or in responding to requests from government agencies.

In accordance with various aspects, the system and method provides companies with complementary tools for automating the document evidence gathering and collection phase in discovery processes. The system and method take advantage of the copiers, printers or multi-functional devices (sometimes in several offices located in different places or countries), that an organization such as a company has and assumes that many relevant documents may be paper documents that have been manipulated at one time by the company employees, without being necessarily stored in electronic format on their laptop or on any storage disk of the company's IT department. An image logging system allows sending all the images captured or handled through each of the company's image output devices (fax, scan, copy, print, email) to an archive, which is accessible to the company or to an outside provider who can mine the content.

A company may have several image output devices, such as printers, copiers, and/or multi-function devices (MFDs), having two or more of printing, scanning, copying, faxing, and emailing capabilities. For the present application, the image output devices and/or network servers supplying them with print jobs serve as image acquisition devices. They are linked to one or more image logging and management system(s) serving as document image collecting and management tools. The images captured or handled through the image output devices (fax, scan, copy, print, email) can thus be stored in data memory and the content can subsequently be mined to retrieve responsive documents.

A document, as used herein, can be any document which has been or is in the process of being output in electronic or hardcopy form, such as a fax, a scan of a hardcopy document, an email, a print job, a digital sound or video recording, indeed any electronically storable data which may constitute evidence for the purposes of discovery. A print job generally includes one or more documents to be printed, usually one or more collated copy sets copied from a set of original print job sheets or electronic document page images, from a particular user, or otherwise related, which is associated with a job ticket that provides instructions for printing the document, such as page size, paper type, instructions for duplex or simplex printing, and the like. An image generally may include information in electronic form which is to be rendered on print media by the image forming device and may include text, graphics, pictures, and the like.

An image log may comprise records together with one or more related images of a job being processed or to be processed by an image output device. The records may include Job information and User information for the job.

Figure 1:
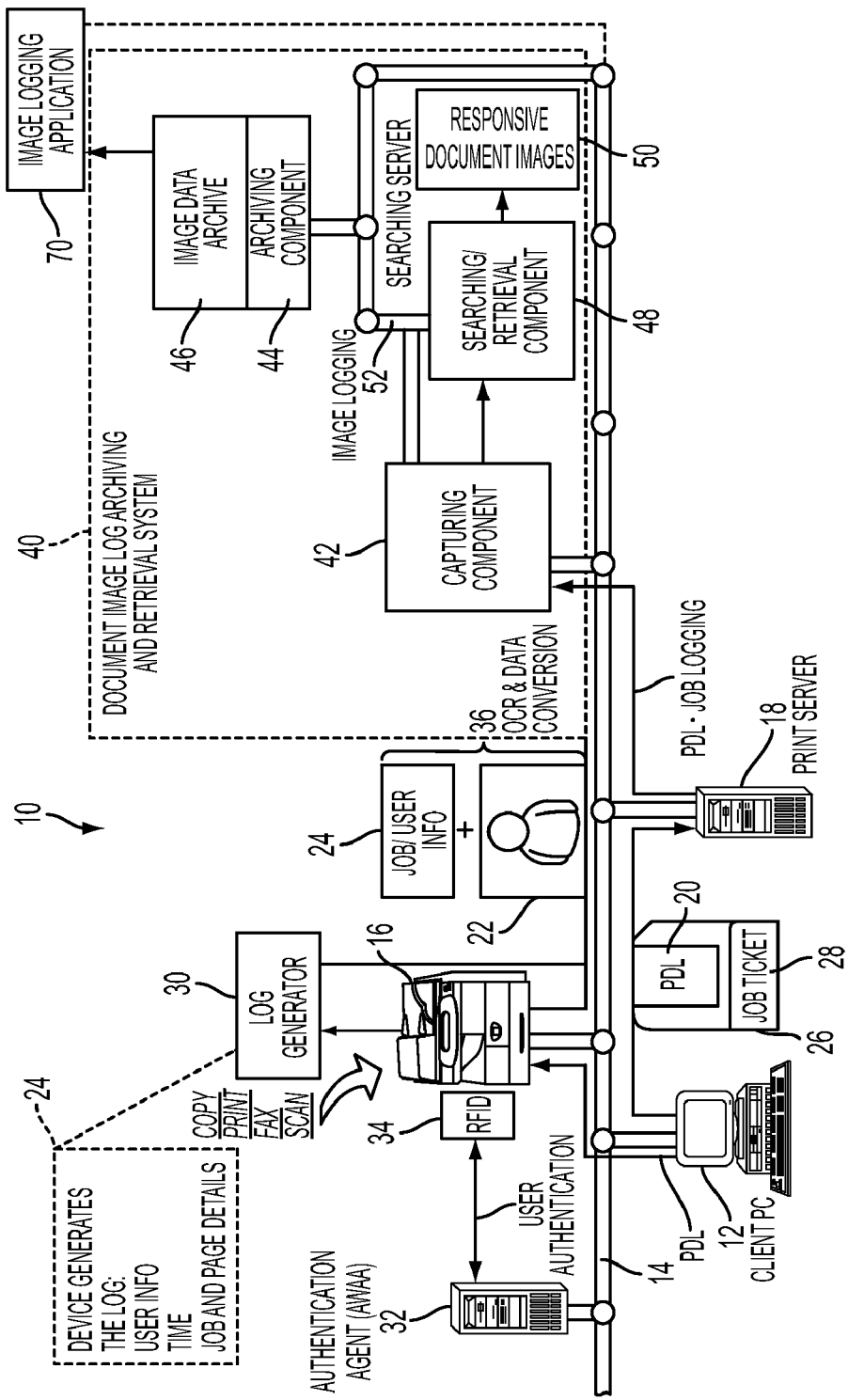
FIG. 1 is a schematic view of a document image archiving and retrieval system in accordance with one aspect of the exemplary embodiment.

With reference to FIG. 1, a print network 10 includes a plurality of computing devices 12 on which documents may be generated, processed, stored, received and output, e.g., in a page description language (PDL) in the case of a print job. In FIG. 1, an exemplary computing device is illustrated as a client personal computer 12, although it is to be appreciated that the network 10 may include many computing devices, such as desktop computers, laptop computers, PDA's and the like. The computing devices 12 are each communicatively linked, e.g., by a wired or wireless network 14, to one or more image output devices 16. In FIG. 1, the output device 16 is illustrated as a multifunction device (MFD), although it is to be appreciated that the networked image output devices can include printers, scanners, fax machines, and multiples and combinations thereof. The computing device 12 may be linked directly to the output device(s) 16 or linked thereto via a network print server 18.

For each document 20 handled or captured by each image output device 16 on the network 14 and, more generally, throughout the entire company, image data 22 is acquired, in the form of digital copies of document images. Log information 24 is also acquired, such as the source of the document, e.g., the user ID, the time that the document was output, and job content details, to the extent available. The document images 22 may be acquired by the output device 16, itself. Alternatively, where a print server 18 is intermediate the outputting computer 12 and the output device 16, document images 22 may be acquired by the server. Log information 24 may be obtained in various ways, depending on the type of document. For a print job 26, the time at which the print job is sent as well as its source may be extracted from the job ticket 28 by a log generator 30, which may be resident in the printer or server. Alternatively, the log generator 30 can be in the form of a separate job tracking agent such as a server or other computer linked to the network. In one embodiment, each client device 12 includes a job tracking agent 30 which generates log information 24 for each output print job and captures associated image data 22. Such an approach may be implemented, for example, through XEROX® Office Services (XOS) suite of device and asset management software.

For a copy or scan job, a user identification system 32, such as an RFID system, which includes a detector 34 located proximate the output device 16, may automatically identify the person generating the copy or scan, e.g., by detecting information on an RFID device carried by the user. Other methods of acquiring ID information, such as a card reader, user input device such as a keypad, a voice recognition system, or the like, may be used to acquire the ID information from the user or otherwise.

All of the acquired images 22 and associated log information 24 is sent, e.g., via the network, to a document image log archiving and retrieval (DIAR) system 40. The DIAR system 40 include a capturing component 42, which captures image logs 36 (images 22 and associated log information 24) for all incoming documents. The capturing component may extract additional information from the document images 22, for example it may employ optical character recognition (OCR) and text processing to retrieve textual content of the document images. A data archiving component 44 stores the image logs 36 in a data archive 46 in a computer storage memory. Each archived image log 36 may thus comprise one or more images 22 forming the same document, any information such as textual content retrieved therefrom, and associated log information (Job information and User information) 24. The job information may include the number of pages of the print job, number of copies requested, time sent to the MFD, etc. The User information includes the users name or unique ID., or IP address of the computing device from which the job was sent. The archive thus stores at least one image log for each document processed at a digital multifunction machine/printer. The image log may be created for an entire job or for each page of a job or for both the entire job and each page.

The data archiving component 44, or a separate component, may use the OCR text or other image classification method to identify documents which are duplicates of previously archived documents and discard them, reducing the number of documents which need to be stored (see, for example, above-mentioned application Ser. No. 12/417,130 now U.S. Pub. No. 20100257141, published Oct. 7, 2010).

When a request for production of documents is received by the company, a search and retrieval component 48 of the DIAR system 40 retrieves relevant documents 50 (e.g., image logs) that are responsive to the request from the archive 46. The use of the DIAR system becomes part of a company document retention policy as one of the established and repeatable processes to follow when it is time for discovery materials to be gathered.

The capturing component 42, data archiving component 44 and search and retrieval component 48 may be in the form of software, hardware or both. In the exemplary embodiment, each of these components is in the form of software, stored in memory, which is implemented by an associated processor, in communication with the memory. Each processing component 42, 44, 48 may have a separate memory and a separate processor. Alternatively, one or more of the components 42, 44, 48 are stored in a common memory and executed by a common processor. The archive 46 may be stored in the same or a separate computer memory to the processing components. The memory or memories of the DIAR may represent any type of tangible computer readable medium such as random access memory (RAM), read only memory (ROM), magnetic disk or tape, optical disk, flash memory, holographic memory, or combination thereof. For example, respective server computers host the capturing component 42, data archiving component 44 and search and retrieval component 48. The various components 42, 44, 46, 48 of the document image log management system 40 may all be connected by a bus 52.

In one embodiment, the image acquisition and logging is performed by Fuji Xerox's "Image Logging System": this is a software and hardware system for the logging and storing of digital multifunction machine/printer processed logs with corresponding processed images. See, for example, U.S. Pub. Nos. 2006/0290975; 2007/0118760; 2007/0133043; 2007/0133054; 2007/0135930; 2008/0100873; 2008/0038002; and 2008/0040350.

Figure 2:
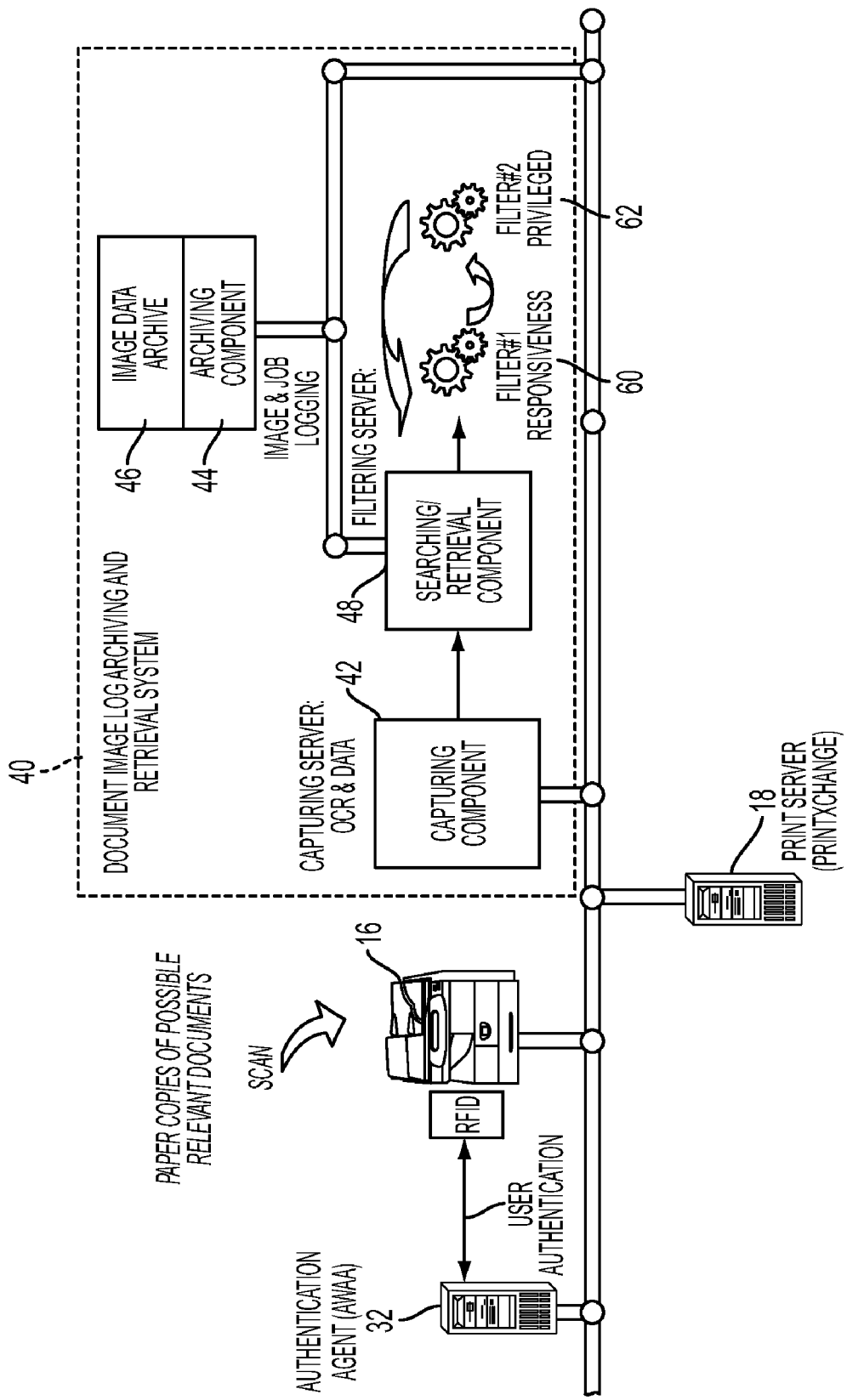
FIG. 2 is a schematic view of the document image archiving and retrieval system during a document retrieval process following a document production request.

With reference now to FIG. 2, when a request for production of documents is made, users may scan additional hardcopy documents which may not previously have been entered into the DIAR system 40, using the image output device 16. The scanned images are automatically sent to and processed by the DIAR system 40 along with the previously acquired document images. The MFD machines of the company thus become the central collection point for all the employees. Every employee processes all the document hardcopies at his disposal through the MFD via the scanner. All the company MFDs are connected to the same DIAR system 40 where the collected documents may be stored in a special archive dedicated to the legal hold, and monitored. Multiple copies of the same jobs are logged only once, thus preventing up-front document duplication (and hence further "deduping" costs). After being captured through the MFD, the pages related to the legal hold are OCRed for further text processing.

For retrieval of relevant documents, several methods are available. In one embodiment, the search and retrieval component 48 includes a cascade of one or more filters 60, 62, which employ respective classifiers for identifying responsive documents (FIG. 2). In the exemplary embodiment, a combination of coarse filtering binary classifiers is employed, however, one or both classifiers may include another type of classifier, such as a multiclass classifier. A first filter 60 identifies responsive documents from the stored documents (filtering out non-responsive documents). The responsive documents which are then passed to a second filter 62, which identifies privileged documents (filtering them from the responsive, non-privileged documents). The responsive documents are each output with a label indicating whether they are classified as privileged or not. The resulting collection is packaged to be sent out to the company's counsel for further review. In other embodiments, rather than using a sequence of binary classifiers, a multi-class classifier may be used (see, for example, above-mentioned U.S. Pat. Nos. 7,139,754; 7,457,808; 2003/0101187; and U.S. Pub. Nos. 2007/0005340; 2007/0005639; 2007/0143101; 2007/0239745; 2008/0249999).

The two coarse filters 60, 62, which may each be one-class classifiers or multi-class classifiers, may be created and monitored by a subject matter expert, such as an in-house attorney or outside counsel. The classifiers are trained through a machine learning method in which training examples of the documents are labeled by class and the classifier learns from the training examples which documents to reject/accept. For the first classifier, the attorney provides a training set of documents including illustrative samples of responsive documents to be collected for the particular litigation matter. For the second classifier, the attorney provides a training set of documents (e.g., a subset of the first set of training documents) which includes samples of privilege documents (such as attorney-client exchanges) that have to be identified and kept out of the final production. Negative samples may also be provided for the training, with each sample being labeled according to its class (responsive/not responsive for the first classifier, privileged/not privileged for the second classifier). Other filters for confidentiality, strategic content, etc. can also be applied. They can be one-class, binary or multi-class classifiers. The trained classifier may include a set of statistical tables (encoding manual input labeling) plus a runtime algorithm for interpreting those tables, with both the tables and the algorithm suitably embodied by a computer or other processing device, and/or by memory or other storage. The classifier is designed to extract, or receive as input, features of a new input document, and is trained or otherwise configured based on the labeled training documents to either reject the document (the document is unclassified) or assign the input document to a class or classes among those which the classifier has been trained to identify (this may be a single class in the case of a one-class classifier, a choice between two classes for a binary classifier, or a choice between N>2 classes for a multi-class classifier) based on the extracted or received features of the input document. In soft classification, a given input document may be assigned a degree of membership in the classes, with the degree of membership being in the range [0,1]. In hard classification a given document is either wholly assigned to a given class or wholly excluded from a given class. In other words, the output of a hard classifier for a given input object and a given class is binary, e.g. "0" or "1", or "yes" or "no. A hard classifier may be derived from a soft classifier by adding a layer of processing that receives the soft classification and makes a binary "yes/no"-type membership decision for each class known from the classifier.

The classifiers 60, 62 may be relatively conservative, i.e., returning documents as responsive even when a soft classification outputs a relatively low probability that the document is responsive, so as to be over-inclusive of documents, rather than risking missing potentially responsive documents.

In one embodiment, the filters 60, 62 can be implemented as Probabilistic Latent Semantic Analysis (PLSA)-based categorizers which are based on the textual content (see, for example, Eric Gaussier, Cyril Goutte, Kris Popat, Francine Chen "A hierarchical model for clustering and categorising documents" In Advances in Information Retrieval—Proceedings of the 24th BCS-IRSG European Colloquium on IR Research (ECIR-02), Mar. 25-27, 2002. Lecture Notes in Computer Science 2291, pp. 229-247, Springer); U.S. application Ser. No. 12/174,721; U.S. Pub. Nos. 2003/0101187, 2005/0187892, 2007/0005340, 2007/0005639, 2007/0239745, 2008/0249999; and U.S. Pat. No. 7,139,754).

In another embodiment, the filters 60, 62 can be implemented as a visual categorizer (statistical image classification), or a hybrid categorizer learning from both textual and visual content.

The methods used by the search and retrieval component 48 in filtering the stored documents are made available, along with the documents retrieved, so that reviewers of the documents can have the assurance that there is a high probability that responsive/privileged documents have been identified. For example, features of documents which contribute to the categorization decision are identified, as disclosed, for example, in above-mentioned U.S. Pat. No. 7,457,808.

Built on top of the DIAR system, an image logging application 70 allows authorized users to review and search (but not modify or delete) the archived image logs 36. The image logging application 70 may be a software application hosted by the server that hosts the DIAR system or by a separate computing device with memory and a processor. The application 70 provides the following functions:

1. User Settings: the system administrator can set up an account for each user to use this application.

2. Search: users can search the image logs using attributes and keywords and check the details of the image logs. The user can search by one or more of Keyword(s), IP address of the device(s), User(s) name or unique universal identifier (UUID), Log Date and Time, Image Log type (page or job). For example up to 20 image logs can be displayed at once per page.

3. Report: users can obtain image log data which has been registered in the archive in the form of a certified server validation (CSV).

4. System Status Display: users can check the changes in the amount of data processed in the DIAR system, available disk space, etc.

The data archive should be sufficiently large to store image logs for several years, in accordance with the company's document retention policy such that, for example image logs for the past 3 years could be searched at once.

In the exemplary system, there is no permanent filtering operating on the search server 48 of the DIAR system. The filtering occurs when a lawsuit is filed or anticipated and the company takes actions to preserve documents. In addition to other data sources usually investigated to search for electronic documents, a search is also automatically conducted of the DIAR system archives to extend the coverage to the document hardcopies that have been manipulated within a given period of time.

The exemplary system 40 can also be used as a virtual watchdog to monitor company practices. The company may designate a watchdog (a person or group) whose function is to monitor the practices of the company. The DIAR system's monitoring of the manipulation of certain sensitive documents within the company can play the role of an electronic virtual watchdog, or be used to enable the designated person to perform his function.

The watchdog, as a subject matter expert, gathers a representative sample of the kind of documents to be monitored. This sample is used to train a single or several one-class classifier coarse filters through a machine learning technology that learns by examples of the documents to reject/accept, as discussed for filters 60, 62. The resulting classifier models are plugged into the filtering server 48, where they are used to process every image log sent to the DIAR system.

The designated watchdog is automatically notified via e-mail whenever a document is accepted by at least one of the filters; the detected documents can also be stored on a dedicated archive and the details of the image logs can be checked, such as log date and time, user name, IP address of the device where the image was created, and so forth. As for the filters 60, 62 the filters used for the virtual watchdog can be implemented as PLSA-based categorizers, as a visual categorizer (statistical image classification), or a hybrid categorizer learning from both textual and visual content.

The exemplary system provides for the automatic gathering and collection of documents for use in litigation or the like. It integrates multi-function printers and their image logging systems with automatic document classifiers. The combination of coarse filtering (one-class, binary, or multi-class) classifiers within image logging and tracing architectures provides a system that enables companies, employees, and legal staff to extend the automatic document collection to document hardcopies, (not only electronic files). It provides a sustainable and repeatable process proving a company's good faith in responding to a legal action, enabling rational explanations and descriptions of how and why documents were collected. In addition, the system reduces the risk of over-collection (large collection of irrelevant data), and duplicates (same documents collected several times).

Using MFDs as document collection points also addresses several issues that a company can face in litigation depending upon its number of employees, their geographic dispersion, the number of sources of documents, and how individuals save them. It also contributes to optimizing the time spent by in-house counsel and outside lawyers handling e-discovery issues, therefore significantly reducing costs and fees.

The system 40 resolves the problem that many documents, even if printed at one time and manipulated as paper copies by a company employees, may no longer have an electronic copy residing somewhere on a company's network, either because those documents have not been preserved, or have been lost or even intentionally erased from the disks. By providing an ongoing document collection method which ensures that copies of all documents handled by the company's image output devices are retained (subject to any predetermined document retention policies), a company can demonstrate its good faith efforts in responding to document production requests.

The company can also provide rational explanations and descriptions of how and why documents were collected and included into the final production, based on the protocol used by the filters.

Figure 3:
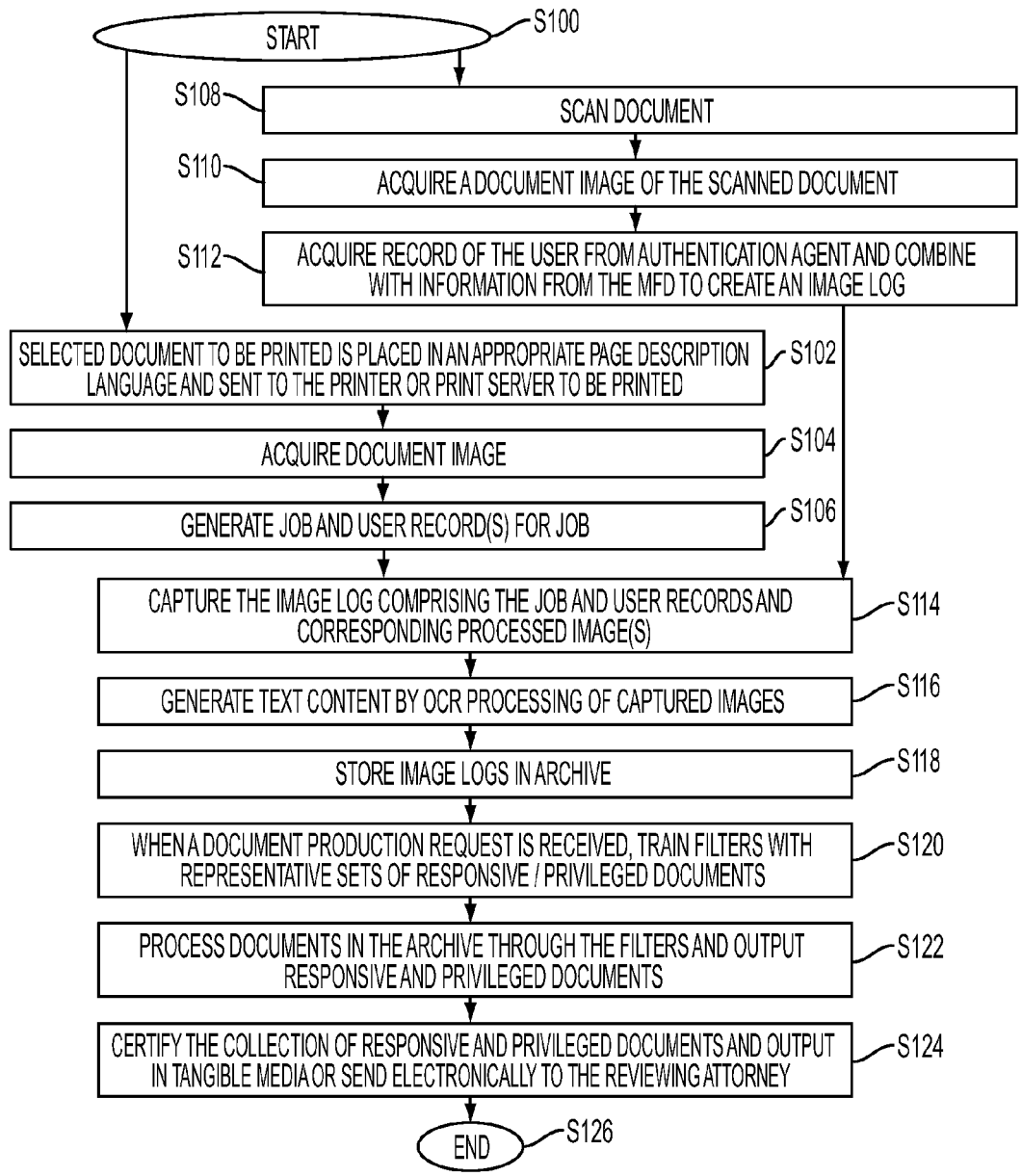
FIG. 3 illustrates a document image archiving and retrieval method which may be performed with the system of FIG. 1 in accordance with another aspect of the exemplary embodiment.

FIG. 3 illustrates the exemplary method of document image logging and retrieval. The method begins at S100.

At S102, a user decides to print a document and actuates the print file option of an application, such as a word processing application. The document is placed in an appropriate page description language by the print driver of the workstation and sent to the printer or print server to be printed.

At S104, a document image is acquired, e.g., by the printer or server.

At S106, a job record and user record are generated, e.g., by the log generator 30 (user name, time, etc).

At S108, a user uses the multifunction device to scan a document, e.g., to be emailed or printed by the MFD.

At S110, a document image is acquired by the MFD.

At S112, a record of the user is generated by the authentication agent and combined with information and image acquired by the MFD to create an image log.

At S114 an image log comprising the job and user records and processed image(s) acquired in steps S104-S106 or S108-S110 is captured and sent to the DIAR system.

At S116, the images in the captured image logs 36 may be OCR processed and the text information stored along with the image log in the archive (S118). Alternatively, OCR processing may be performed at the time of document production.

At S120 a document production request is received. The filter 60 is trained with a set of responsive documents and filter 62 with a set of privileged documents. The training documents are of the type which the attorney considers are representative of the documents being sought.

At S122, the image logs of the documents in the archive are processed through the filters and responsive and privileged documents corresponding to the logs are output. Optionally, the method may include measuring precision and recall on some of the retrieved responsive and privileged documents to check that the system is functioning correctly.

At S124, the collection of responsive and privileged documents is automatically certified, to prevent tampering, automatically stored on a recording medium along with the certificate, and sent to the reviewing attorney.

The method ends at S126.

The method illustrated in FIG. 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 3, can be used to implement the document image archiving and retrieval method.

While the system has been described primarily in connection with the e-discovery domain, the system may also find application in the security field (protection of trade secrets, protection of other confidential information), in satisfying auditing requirements, whether for legal purposes, meeting industry standards, or as part of internal controls, (audit trails of documents for example in financial institutions such as banks, insurance companies, stock broker firms, and the like). While the exemplary system is primarily for monitoring documents from an MFD through classification filters, this does not prevent monitoring other sources at the same time. For example, the system may also monitor other electronic document sources, such as email archives, document repositories, and the like.

By way of example, the system may prove invaluable in the following instances:

1. Company A is accused of acquiring sensitive documents belonging to company B without Company B's consent. Company A can demonstrate, through having utilized the exemplary DIAR system, that no Company B documents were copied or printed or otherwise manipulated by the company's image output devices, by Company A employees in a given time period. To provide greater assurance, the DIAR system is in the custody and under the control of a disinterested party, company C.

2. Company A senior executives are accused of handling sensitive company B documents. The DIAR system is used to demonstrate that no executive was logged as having copied, printed or otherwise manipulated company B documents, using company A's image output devices, but that a low level employee, who had since been fired, had handled company B documents.

3. Company B questions the protocols used by the DIAR system filters in production of Company A documents. Company B is permitted to submit new or replacement training documents to retrain the filter classifiers and review a selection of the non-privileged documents retrieved. Or, new test documents may be archived and the system checked to see if they are retrieved. Alternatively, features contributing to the selection of documents by the system are identified and provided to Company B.

4. Company A executive D is accused of using data acquired from company B sensitive documents to make a comparison with company A data. The DIAR system shows that no documents manipulated by company A's image output devices contain company B data in the OCR processed text of the stored documents. Alternatively, one of the filters 60, 62 may be trained to identify, from the logs, documents associated to Executive D's ID, and this filter applied to the searched sensitive documents to retrieve the logs and their associated job information which include Executive D's ID.

5. Company A suspects than one or more of its employees is copying sensitive company A documents without authorization. Using keyword searching of OCR text of the stored documents and/or a search of the stored job information, the DIAR system is able to identify after-hours copying of a large number of company A sensitive documents by employee E, who is logged as having made the copies. As an alternative to the keyword searching, one of the filters 60, 62 may be trained on samples of possibly sensitive documents, and this filter applied to the DIAR system in order to retrieve logs of documents of the same category/topic, which can be used, through their associated job log in the archive, to obtain the ID of the employee who was logged as making the copies.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for document image acquisition and retrieval comprising:
   automatically acquiring image logs comprising image data and associated records for documents being processed by a plurality of image output devices within an organization;
   archiving the image logs for the processed documents in a computer-readable storage medium;
   when a request for document production is received by the organization for discovery of responsive documents in litigation, with a computer processor, automatically filtering the image logs, through a first classifier trained to return documents that are responsive to the document production request and a second classifier trained to return those of the responsive documents that are privileged, the privileged documents comprising attorney-client exchanges, the first and second classifiers having been trained through a machine learning method with training examples of the documents labeled with respective classes; and
   outputting responsive documents.

2. The method of claim 1, further comprising performing optical character recognition of the image data to identify textual content of the documents and wherein the image logs filtered in the classification of the documents includes the textual content.

3. The method of claim 1, further comprising identifying duplicate document images and archiving only a single one of the duplicate images which is associated with plural image logs.

4. The method of claim 1, wherein at least one of the image output devices is a multifunction printer device and wherein for documents processed by scanning, the acquiring of the associated records includes detecting an identity of a person performing the scanning.

5. The method of claim 1, further comprising identifying features of documents contributing to their classification as responsive or non-responsive.

6. The method of claim 1, wherein at least one of the classifiers is a binary classifier.

7. The method of claim 1, wherein the automatically acquiring image data includes acquiring the images from the image output device or from a print server communicatively lined to the image output device.

8. The method of claim 1, further comprising automatically forming a collection of all documents returned by at least one of the classifiers and certifying them as a whole so that any tampering is detectable.

9. The method of claim 1, wherein the automatic acquiring of image logs for documents being processed by the plurality of image output devices within an organization ensures that image data is acquired for all documents being processed by the organization's image processing devices.

10. The method of claim 1, wherein the image log records each include job information and user information.

11. The method of claim 1, wherein the archiving and filtering are performed at a location outside the control of the organization.

12. The method of claim 1, wherein the automatically acquiring image data precludes acquiring image data resident on a workstation which has not been output for processing by the image output device.

13. The method of claim 1, wherein the automatically filtering of the image logs is performed prior to production of documents responsive to the request.

14. A computer program product comprising a non-transitory recording medium encoding instructions, which when executed on a computer causes the computer to perform the method of claim 1.

15. A computer implemented system for performing the method of claim 1 comprising software instructions stored in memory for performing the method and at least one computer processor, in communication with the memory, for executing the instructions.

16. A computer implemented system for document image log acquisition and retrieval comprising:
   a capturing component which automatically acquires image data and associated records for documents being processed by a plurality of image output devices;
   an archiving component which receives the acquired image data and records from the capturing component and archives image logs comprising the image data and associated records in an associated archive;
   a selection component which automatically filters the image logs or information extracted therefrom through at least one classifier trained to return documents responsive to a document request, the at least one classifier including a first classifier trained to return documents that are responsive to the document production request and a second classifier trained to return those of the responsive documents that are privileged, the privileged documents comprising attorney-client exchanges; and
   at least one computer processor for implementing the components.

17. The system of claim 16, wherein the capturing component includes an OCR processing component which processed the acquired documents to identify textual content and wherein the classifier is configured for being trained on text content of a training set of responsive documents.

18. The system of claim 16, wherein the capturing component, archiving component, and selection component are maintained at a location remote from the image output devices.

19. The method of claim 16, further comprising a watchdog component which allows users to review the archived image logs without modifying or deleting them.

20. A method for document image acquisition and retrieval comprising:
   automatically capturing image logs for all documents being printed, copied, scanned, or faxed by all image output devices within an organization, the image output devices being selected from printers, copiers, scanners, fax machines, and multifunction printing devices;
   automatically archiving the captured image logs for at least a predetermined retention period;
   when a request for document production is received by the organization, training at least one classifier with a training set of responsive documents and automatically filtering the archived captured image logs or information extracted therefrom through the at least one classifier to generate a set of responsive documents corresponding to filtered ones of the image logs, the at least one classifier comprising a first binary classifier which identifies the responsive documents and a second binary classifier which identifies privileged ones of the responsive documents; and
   outputting the set of responsive documents.

21. The method of claim 20, wherein the document request is a request for discovery of responsive documents in litigation.

22. A computer program product comprising a non-transitory recording medium encoding instructions, which when executed on a computer causes the computer to perform the method of claim 20.

* * * * *